US012479014B2

(12) United States Patent
Khathami et al.

(10) Patent No.: US 12,479,014 B2
(45) Date of Patent: Nov. 25, 2025

(54) SYSTEMS AND PROCESSES FOR CHEMICAL PROCESSING

(71) Applicant: Saudi Arabian Oil Company, Dhahran (SA)

(72) Inventors: Tariq A. Khathami, Dammam (SA); Mazin M. Fathi, Dammam (SA); Abdullah M. Salma, Dhahran (SA); Abdulrahman E. Sayed, Dhahran (SA); Massad S. Alanzi, Dammam (SA); Hamad Alsaiari, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/344,498

(22) Filed: Jun. 29, 2023

(65) Prior Publication Data

US 2025/0001468 A1 Jan. 2, 2025

(51) Int. Cl.
*B08B 9/04* (2006.01)
*B08B 13/00* (2006.01)
*H01F 7/02* (2006.01)

(52) U.S. Cl.
CPC ................ *B08B 9/04* (2013.01); *B08B 13/00* (2013.01); *H01F 7/02* (2013.01); *B08B 2209/04* (2013.01)

(58) Field of Classification Search
None
See application file for complete search history.

(56) References Cited

U.S. PATENT DOCUMENTS 11,384,291 B1 7/2022 Fathi et al.
2013/0081653 A1 4/2013 Kountotsis et al.
2015/0375359 A1* 12/2015 Cui ........................ B24B 1/005 451/113

FOREIGN PATENT DOCUMENTS

CN 110369412 * 10/2019
JP 2011251060 * 12/2011

OTHER PUBLICATIONS

Translation of CN110369412 by Xuzhou, published Oct. 25, 2019.*
Translation of JP2011251060 by Saito, published Dec. 15, 2011.*
Yadav, "Effect of Temperature on Electric Current, Magnets and Electromagnet", International Journal of Advancements in Technology, vol. 7, Issue 4, 2016.
Wolski, "Maxwell's equations for magnets", University of Liverpool, and the Cockcroft Institute, UK, 2011.

* cited by examiner

*Primary Examiner* — Kaj K Olsen
*Assistant Examiner* — Ryan L Coleman
(74) *Attorney, Agent, or Firm* — DINSMORE & SHOHL LLP

(57) ABSTRACT

A system for chemical processing includes a hollow structure including a side wall having an exterior surface and an interior surface defining an internal volume. The hollow structure has a center axis, a length, and an outer perimeter. The outer perimeter is a shape of the exterior surface of the side wall of the hollow structure in a plane perpendicular to the center axis. The system includes a metallic object positioned within the internal volume of the hollow structure. The system also includes at least two magnets slidably coupled to the exterior surface of the side wall, where the magnets guide movement of the at least one metallic object within the hollow structure. The magnets operate to impact the metallic object against the solid deposits to loosen the solid deposits from the interior surface of the side wall.

12 Claims, 10 Drawing Sheets

SYSTEMS AND PROCESSES FOR CHEMICAL PROCESSING

BACKGROUND

Field

The present disclosure relates to systems and methods for chemical processing, more specifically, to the removal of solid deposits from inside a hollow structure in which chemical processing takes place.

Technical Background

Solid deposits may accumulate on the inner surface of vessels or lines of chemical processing systems such as located in hydrocarbon refineries, petrochemical industries, power plants, or desalination plants. Accumulation of the solid deposits may result in an increase in pressure drop and a decrease in heat transfer, decreasing the efficiency of the system. The solid deposits may be removed through pressurized water or other mechanical tools. The solid deposits may also be removed through the use of chemical solutions. However, typical methods using mechanical tools to remove the accumulation of solid deposits on the inner surface of vessels and lines require a full shut down and isolation of the processing system, which is time consuming and costly. Typical methods using chemical solutions require very high temperatures and do not result in the removal of all solid deposits.

SUMMARY

Accordingly, there is an ongoing need for systems and methods for chemical processing and removal of solid deposits from interior surfaces of chemical processing units. Additionally, there may be a need for the automatically determining a location of the accumulation of solid deposits and operating the system through a machine learning module.

According to embodiments of the present disclosure, a system for chemical processing may include a hollow structure including at least one side wall having an exterior surface and an interior surface defining an internal volume of the hollow structure. The hollow structure may have a center axis, a length measured parallel to a center axis, and an outer perimeter. The outer perimeter may be a shape of the exterior surface of the at least one side wall of the hollow structure in a plane perpendicular to the center axis. The system for chemical processing may also include at least one metallic object positioned within the internal volume of the hollow structure. The at least one metallic object may be decoupled from the interior surface and free to move within the internal volume of the hollow structure relative to the side wall of the hollow structure. The system for chemical processing may also include at least two magnets slidably coupled to the exterior surface of the at least one side wall, where the at least two magnets guide movement of the at least one metallic object within the hollow structure.

A process for removing solid deposits from interior surfaces of a hollow structure may include introducing at least one metallic object into the hollow structure. The hollow structure may include at least one side wall having an exterior surface and an interior surface defining an internal volume of the hollow structure. The hollow structure may have the center axis, a length measured parallel to the center axis, and an outer perimeter. The outer perimeter may be a shape of the exterior surface of the at least one side wall of the hollow structure in a plane perpendicular to the center axis. The process for removing solid deposits may further include attracting the at least one metallic object to a first point on the interior surface with a first magnet. Attracting the at least one metallic object to the first point on the interior surface may cause the at least one metallic object to impact the interior surface at the first point and impact of the at least one metallic object with the interior surface at the first point may loosen solid deposits from the interior surface at the first point. The process for removing solid deposits may also include attracting the at least one metallic object to a second point on the interior surface with a second magnet. Attracting the at least one metallic object to the second point on the interior surface may cause the at least one metallic object to impact the interior surface at the second point and impact of the at least one metallic object with the interior surface at the second point may loosen solid deposits from the interior surface at the second point.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, in which like structure may be indicated with like reference numerals and in which.

DETAILED DESCRIPTION

Figure 1:
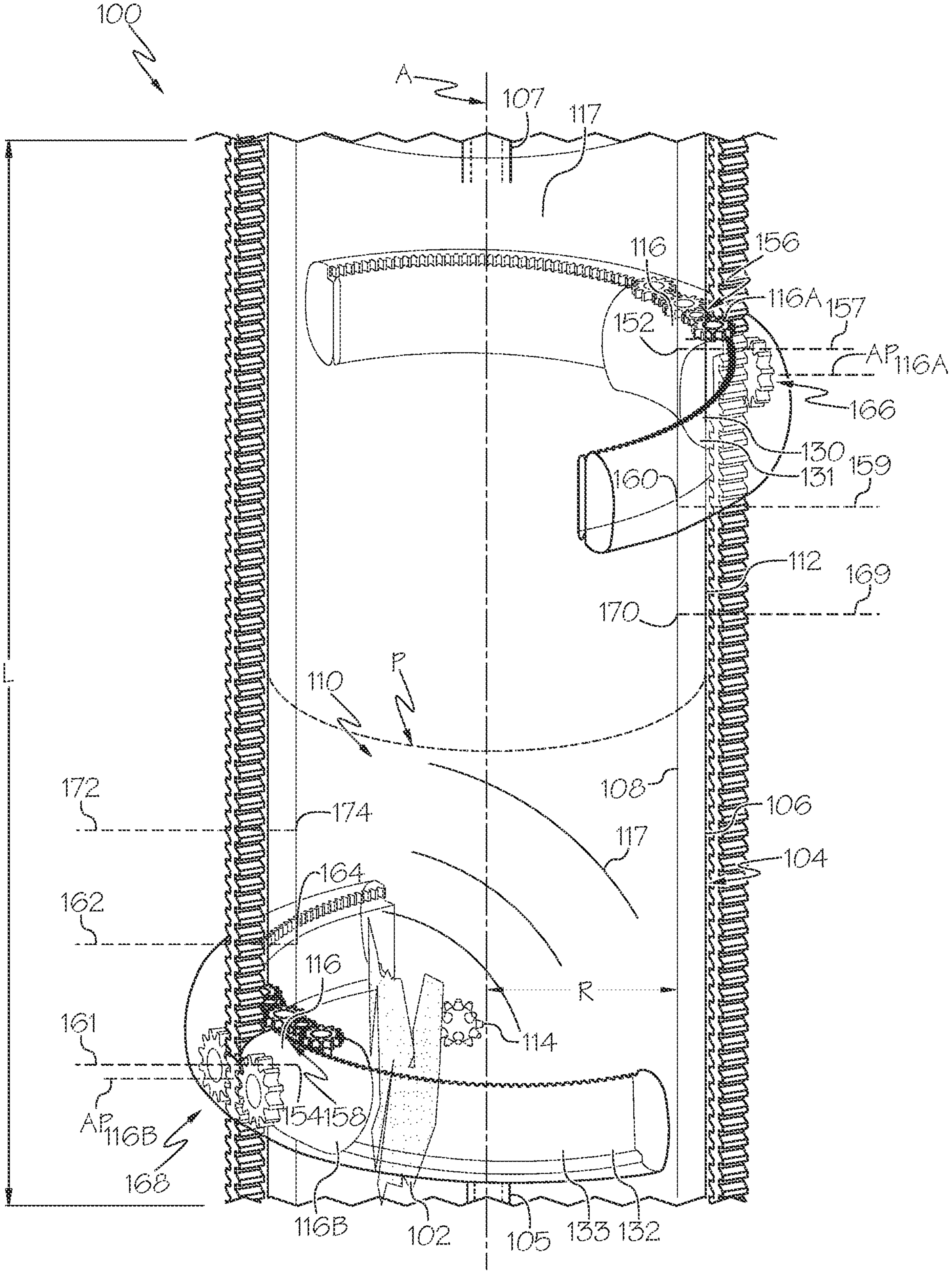
FIG. 1 schematically depicts a front perspective view of a system for chemical processing comprising including at least one metallic object positioned within an internal volume of a hollow structure, according to embodiments shown and described in the present disclosure.

Embodiments of the present disclosure are described in the detailed description, which follows. The present disclosure may be directed to systems and processes for chemical processing. In particular, the present disclosure is directed to systems and processes for removing solid deposits from interior surfaces of hollow structures of chemical processing units. Referring now to FIG. 1, one embodiment of a system 100 of the present disclosure for chemical processing may include a hollow structure 104 that includes at least one side wall 106 having and an interior surface 108 defining an internal volume 110 of the hollow structure 104. The side wall 106 may have an exterior surface 112. The hollow structure 104 may have a center axis A, an axial length L measured parallel to the center axis A, and an outer perimeter P, where the outer perimeter P is a shape of the exterior surface 112 of the at least one side wall 106 of the hollow structure 104 in a plane perpendicular to the center axis A. The system 100 may also include at least one metallic object 114 positioned within the internal volume 110 of the hollow structure 104. The at least one metallic object 114 may be decoupled from the interior surface 108 and free to move within the internal volume 110 relative to the hollow structure 104. The system 100 may also include at least two magnets 116 slidably coupled to the exterior surface 112 of the at least one side wall 106, where the at least two magnets 116 may guide movement of the at least one metallic object 114 within the hollow structure 104.

As used throughout the present disclosure, the term "axial" refers to a direction that is substantially parallel to the central axis A of the hollow structure.

As used throughout the present disclosure, the term "angular" refers to a direction that is around a circumference of the hollow structure, such as around the outer perimeter P of the hollow structure.

As used throughout the present disclosure, the term "radial" refers to a direction that is perpendicular to and outward from the central axis A of the hollow structure.

As used throughout the present disclosure, "solid deposits" refer to salts, coke, asphaltenes, carbon, or any other byproduct of a hydrocarbon chemical reaction or hydrocarbon processing that may be disposed on an inner surface of the hollow structure.

As used throughout the present disclosure, the terms "upstream" and "downstream" refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

Systems for chemical processing, such as but not limited to petrochemical reactors, heaters, heat exchangers, transfer piping, catalyst regenerators, separation units, or other chemical processing units may include hollow structures, such as but not limited to pipes, tanks, pressure vessels, or other hollow structures, that contact process fluids during chemical processing. During operation of the systems for chemical processing, the hollow structures of the system can accumulate solid deposits on the inner walls of hollow structures. Such solid deposits may include but are not limited to coke, salts, asphaltenes, or combinations of these. Accumulation of the solid deposits on the inner walls may lead to increased pressure drop, decreased heat transfer, restricted flow, or combinations of these conditions, which may decrease the efficiency of the system and lead to poor product quality.

Removal systems and methods have been developed to remove the solid deposits in such systems for chemical processes. These conventional methods of removing solid deposits involve the use of mechanical tools or chemical solutions to remove the solid deposits. However, conventional mechanical tools require full shut down and isolation of the targeted system, and utilization of chemical solutions requires very high temperatures and does not remove solid deposits with stronger bonds, such as hard coke, that require more dissociation energy to break. Use of chemical solutions can also result in the corrosion of the hollow structure as well as other equipment and piping systems.

The present disclosure solves these problems by providing systems and processes for chemical processing that enable removal of solid deposits from the interior surfaces of the hollow structures of the system while maintaining the system at operating temperatures and pressures. Referring again to FIG. 1, the system 100 comprises the hollow structure 104 that includes at least one side wall 106 having an interior surface 108 defining an internal volume 110 of the hollow structure 104 and an exterior surface 112. The hollow structure 104 may have the center axis A, the axial length L measured parallel to the center axis A, and the outer perimeter P, where the outer perimeter P is a shape of the exterior surface 112 of the at least one side wall 106 of the hollow structure 104 in the plane perpendicular to the center axis A. The system 100 further may comprise the metallic object 114 positioned within the internal volume 110 of the hollow structure 104. The metallic object 114 may be decoupled from the interior surface 108 of the hollow structure 104 so that the metallic object 114 is free to move within the internal volume 110 relative to the hollow structure 104. The system 100 further may comprise at least two magnets 116 slidably coupled to the exterior surface 112 of the at least one side wall 106, where the magnets 116 may guide movement of the metallic object 114 within the internal volume 110 of the hollow structure 104. Also described herein is a process for removing solid deposits 102 (FIG. 2) from the interior surfaces 108 of the hollow structure 104.

The system and methods may include turning the magnets 116 on and off, attracting the metallic object 114 to various points on the interior surface 108 of the hollow structure 104. The metallic object may impact the interior surface 108 of the hollow structure 104, loosening solid deposits 102 that have built up on the interior surface 108. The systems of the present disclosure may also include removal of the solid deposits 102 from the system through introducing a solvent 115 to the system. The introduction of the solvent 115 into the system may further loosen the solid deposits 102 from the interior surface 108. The solvent 115 may also help to dissolve the solid deposits 102 from the interior surface 108 and carry the solid deposits 102 out of the internal volume 110. The systems and methods of the present disclosure may allow for online removal of solid deposits for continuous operation of the system. As such, the systems and methods of the present disclosure may eliminate the need to shut down the system to remove solid deposits from the interior surface 108. This results in increased efficiency by removing the solid deposits while the system is running and maintaining the equipment at operating temperature and pressure, which eliminates the need for heating up and cooling down equipment for removing the solid deposits through conventional mechanical tools. The systems and methods of the present disclosure may also allow for offline removal of solid deposits.

Referring again to FIG. 1, the systems 100 for chemical processing may include the hollow structure 104 comprising the side walls 106. The side walls 106 may include the interior surface 108 defining an internal volume 110 and the exterior surface 112. The at least one metallic object 114 may positioned within the internal volume 110 and the at least one metallic object 114 may be decoupled from the interior surface 108 and free to move relative to the hollow structure 104. The system 100 may further include a plurality of magnets 116, such as two or more magnets 116, which are slidably coupled to the exterior surface 112 of the side walls 106. The magnets 116 may guide movement of the at least one metallic object 114 within the hollow structure 104.

The hollow structure 104 may be a vessel, reactor, conduit, drum, barrel, vat, heat exchanger, process line, or any other hollow structure of the system 100 for chemical processing. In embodiments, the hollow structure 104 may be a vessel or reactor in which chemical processing may take place. In embodiments, the hollow structure 104 may be a conduit or process line primary utilized for transferring materials within the system 100 for chemical processing. Referring to FIG. 1, the hollow structure 104 is depicted as cylindrical; however, it should be understood that the hollow structure 104 may be of any geometric configuration suitable for the given chemical processing. In embodiments, the hollow structure 104 may have a cross-sectional shape that is consistent along the axial length L, where the cross-sectional shape is the shape of the hollow structure 104 in a plane perpendicular to the center axis A. In embodiments, the hollow structure 104 may have a cross-sectional shape that varies along the axial length L of the hollow structure 104. In such embodiments, the center axis A of the hollow structure 104 may be an average of the geometric centers of the cross-sections throughout the axial length L of the hollow structure 104.

The side walls 106 of the hollow structure 104 may be constructed of a rigid material. The side walls 106 may be constructed of metal, ceramic, glass, or any other suitable material for withstanding temperatures of up to, from example, 1,000° C. within the internal volume 110, and optionally may be coated with refractory materials for heat management. In embodiments, the hollow structure 104 may be insulated on the interior surface 108 or the exterior surface 112, such that heat in the internal volume 110 does not escape through the side walls 106. The hollow structure 104 may be fluidly coupled to at least one inlet 105 and at least one outlet 107, as is further described below.

Figure 2A:
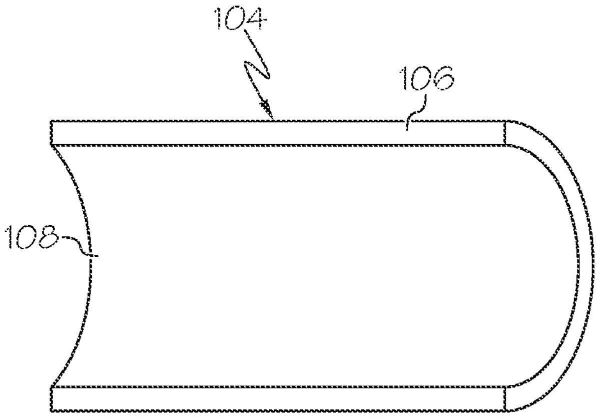
FIG. 2A schematically depicts a cross-section of a hollow structure of the system of FIG. 1, according to embodiments shown and described in the present disclosure.
Figure 2B:
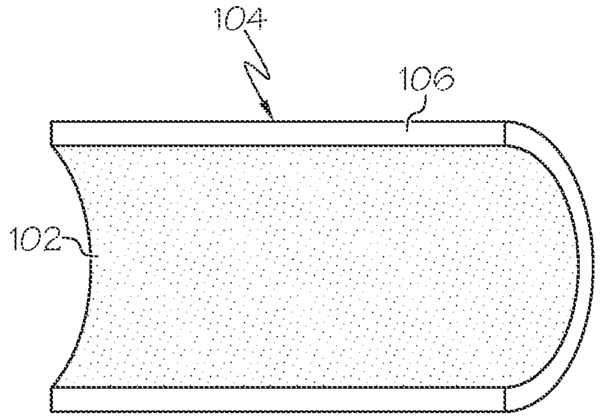
FIG. 2B schematically depicts solid deposits on an interior surface of the hollow structure of FIG. 2A, according to embodiments shown and described in the present disclosure.
Figure 3:
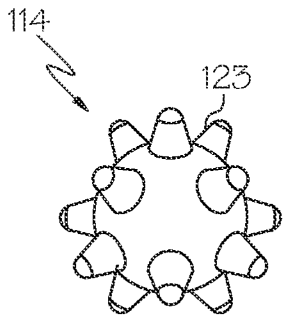
FIG. 3 schematically depicts a perspective view of a spherical metallic object having a plurality of elevated surface features, according to embodiments shown and described in the present disclosure.
Figure 4:
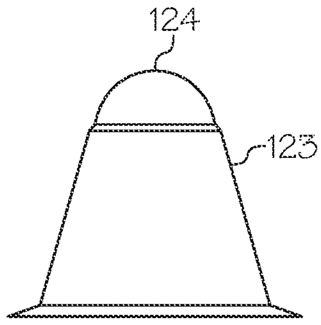
FIG. 4 schematically depicts a side view of one of the elevated surface features of the spherical metallic object of FIG. 3, according to embodiments shown and described in the present disclosure.
Figure 5:
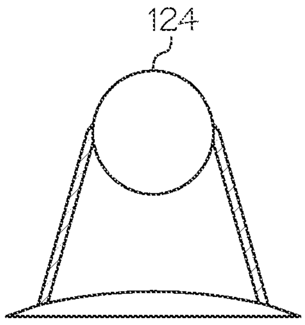
FIG. 5 schematically depicts a cross-section of the elevated surface feature of FIG. 4, according to embodiments shown and described in the present disclosure.
Figure 6:
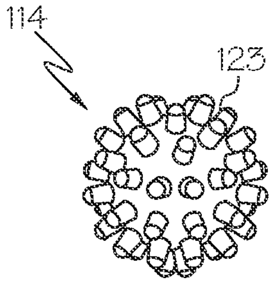
FIG. 6 schematically depicts a perspective view of a second metallic object having a plurality of elevated surface features, according to embodiments shown and described in the present disclosure.
Figure 7:
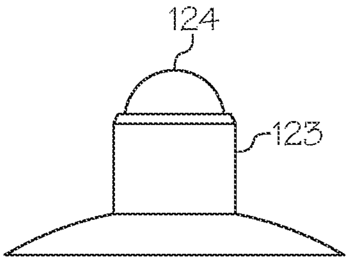
FIG. 7 schematically depicts a side view of one of the elevated surface features of the spherical metallic object of FIG. 6, according to embodiments shown and described in the present disclosure.
Figure 8:
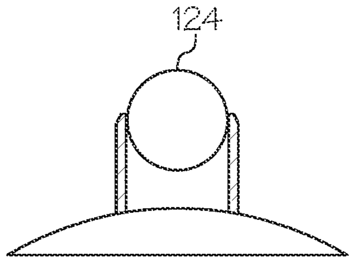
FIG. 8 schematically depicts a cross-section of the elevated surface feature of FIG. 7, according to embodiments shown and described in the present disclosure.

Referring now to FIG. 2A, the interior surface 108 of the side wall 106 may be clean before the chemical processing has occurred in the hollow structure 104, such that the interior surface 108 of the side wall 106 is visible. However, as depicted in FIG. 2B, solid deposits 102 may accumulate on the interior surface 108 of the side wall 106 during chemical processing in the hollow structure 104. For example, coke, salts, asphaltenes, or other particulates or solids may develop as the solid deposits 102 on the interior surface 108 of the side walls 106. The solid deposits 102 may also include carbon byproducts of a petrochemical reaction. The carbon byproducts accumulate on the interior surface 108 of the side wall 106, which may cause decreased efficiency, decreased heat transfer rate, poor product quality of processed materials, contamination of materials, or other undesirable results. The solid deposits 102 may accumulate on certain parts of the interior surface 108 (as depicted in FIG. 1) or the entirety of the interior surface 108 (as depicted in FIG. 2B). In embodiments, there may be patterns as to where the solid deposits 102 form on the interior surface 108 based on the dimensions of the hollow structure 104, type of chemical processing, type of chemical processing, flow patterns of particulates and solid components within the hollow structure 104, or combinations thereof (discussed further below in the discussion of FIG. 14).

Referring again to FIG. 1, the metallic object 114 may be used to loosen or remove the solid deposits 102 from the interior surface 108 of the hollow structure 104. The metallic object 114 may be decoupled from the interior surface 108, which allows the metallic object 114 to move freely within the internal volume 110 of the hollow structure 104. The metallic object 114 may be caused to impact the solid deposits 102 at one or a plurality of points on the interior surface 108 of the at least one side wall 106. Impact of the at least one metallic object 114 against the solid deposits on the interior surface 108 of the side wall 106 may cause loosening of the solid deposits from the interior surface 108 of the side walls 106 at the points impacted. The metallic object 114 may have a radius that is less than an inner radius R of the hollow structure 104, measured from one side wall 106 to the center axis A. For example, in embodiments, the hollow structure 104 may include a pipe with an inner radius R of 37.5 millimeters. In such embodiments, the metallic object 114 may include a radius of less than 37.5 millimeters. In embodiments, the metallic object 114 may have a radius of from 5 millimeters to 100 millimeters, any other suitable radius.

The metallic object 114 may be constructed of a rigid material, such as but not limited to a metal or metal alloy comprising Cobalt, Nickel, Awaruite, Permalloy, Wairakite, combinations thereof, or any other suitable material. There may be one, two, three, four, or more than four of the metallic objects 114 disposed within the hollow structure 104. The metallic object 114 may be inside the hollow structure 104 during the chemical processing in the hollow structure 104 such as during online operation of the hollow structure 104. The metallic object 114 may be reusable. The number of times the metallic object 114 may be reused or the number of times the metallic object 114 can impact the interior surface 108 may depend on the hardness of the metallic object 114.

The metallic object 114 may need to be of a certain hardness in order to loosen the solid deposits 102 upon impact with the interior surface 108. In embodiments, the metallic object 114 may have a hardness from 40 to 70 on the Rockwell C Scale when measured according to ASTM E18-20. The hardness of the metallic object 114 is directly proportional to the compressive and tensile strengths of the metallic object 114. Moreover, the hardness of the metallic object 114 is directly proportional to the ability of the metallic object 114 to resist deformation by stretching, compression, penetration, indentation, and scratching. When the metallic object 114 is not hard enough, such as when the metallic object 114 has a hardness less than 40 on the Rockwell C Scale when measured according to ASTM E18-20, the metallic object 114 may be more susceptible to erosion and corrosion during the chemical processing, either due to contact with heated solvent, repeated impact, or both. If the metallic object 114 is not hard enough, the lack of hardness may also prevent the impact of the metallic object 114 on the interior surface 108 from loosening the solid deposits 102. The metallic object 114 may be of various geometries, as depicted in FIGS. 3-11.

As depicted in FIGS. 3-8, the metallic object 114 may be substantially spherical with a plurality of elevated surface features 123. In embodiments, the metallic object 114 may be cubical, hexagonal, or any other suitable shape. The elevated surface features 123 may be coupled to the metallic object 114 at a proximal end of the elevated surface feature 123, such that a distal end of the elevated surface feature 123 impacts the interior surface 108 of the side wall 106. As depicted in FIGS. 3-8 the distal end of the elevated surface feature 123 may also be rotatable, such that a rotatable sphere 124 is coupled to the distal end of the elevated surface feature 123. The rotatable sphere 124 and the elevated surface features 123 may be the same or different material that the metallic object 114 is made of, such as Cobalt, Nickel, Awaruite, Permalloy, Wairakite, combinations thereof, or any other suitable material.

Figure 9:
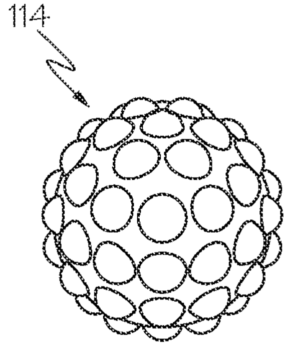
FIG. 9 schematically depicts a perspective view of a third spherical metallic object without a plurality of elevated surface features, according to embodiments shown and described in the present disclosure.
Figure 10:
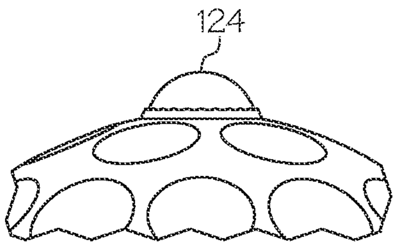
FIG. 10 schematically depicts a side view of the spherical metallic object of FIG. 9, according to embodiments shown and described in the present disclosure.
Figure 11:
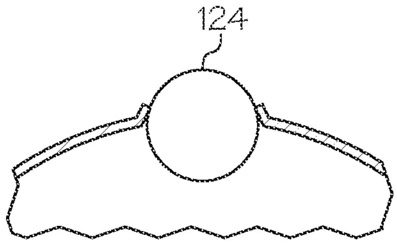
FIG. 11 schematically depicts a cross-section of the spherical metallic object of FIG. 9, according to embodiments shown and described in the present disclosure.

In embodiments such as those depicted in FIGS. 9-11, the metallic object 114 may not have the elevated surface features 123, but the rotatable sphere 124 may rotatably coupled directly to the metallic object 114, such that when the metallic object 114 is translated along the interior surface 108 of the at least one side wall 106, the rotatable spheres 124 rotate along the interior surface 108. The term "rotatably coupled" means that the rotatable sphere 124 secured to the metallic object 114 so that the rotatable sphere 124 is not separable from the metallic object 114, but the rotatable sphere 124 is able to rotate relative to a body of the metallic object 114.

Referring again to FIG. 1, the system 100 comprises the plurality of magnets 116. The plurality of magnets 116 may be disposed outside of the hollow structure 104. The magnets 116 may be slidably coupled to the exterior surface 112 of the at least one side wall 106. As discussed hereinabove, the magnets 116 may guide movement of the metallic object 114 within the hollow structure 104. The magnets 116 may be electromagnets, permanent magnets, or any other suitable magnet type. Permanent magnets may be used as the magnets 116 if low temperature chemical processing (such as less than 100° C.) are taking place within the hollow structure 104. If the magnets 116 are permanent magnets, the permanent magnets may be turned on and off through the use of a magnetic switch. If the magnets 116 are electromagnets, an electric current may be provided to the electromagnets. Electric current provided to the electromagnets activates the electromagnets and induces the magnetic field 117 in the magnets 116. When the electric current is no longer supplied to the magnets 116, the magnets 116 may be deactivated.

The magnets 116 may produce an electromagnetic force that is sufficient to cause the metallic object 114 within the hollow structure 104 to travel through the internal volume 110 of the hollow structure 104 to impact the interior surface 108 of the hollow structure 104 proximate to the magnet 116. In embodiments, the magnets 116 may be electromagnets and may have an adjustable electromagnetic force that the magnets 116 produce. In embodiments, the intensity of the electromagnetic force the magnets 116 produced may be based on the amount of electric current running through the electromagnets. The intensity of the electromagnetic force required in the system 100 may depend on a distance between the two magnets 116, which may depend on the inner radius R of the hollow structure 104. For a hollow structure 104 having a larger inner radius R, the magnets may have greater electromagnetic force compared to a hollow structure 104 having a smaller inner radius R.

The intensity of electromagnetic force required by the magnets 116 may also be based on resistance applied to the metallic object 114 within the hollow structure 104. The resistance applied to the metallic object 114 within the hollow structure 104 may depend on the temperature of the chemical processing taking place, the flow rate of the solvent 115 (discussed in FIG. 12) flowing through the hollow structure 104, the type of solvent 115 flowing through the hollow structure 104, or any other factor that might effect the amount of resistance applied to the metallic object 114 when the metallic object 114 moves across the internal volume from a location of a first magnet 116A to a location of a second magnet 116B.

As depicted in FIG. 1, the magnets 116 may be on opposing sides of the exterior surface 112 of the hollow structure 104. The at least two magnets 116 may also be parallel, perpendicular, or arranged at an angle with respect to one another. The at least two magnets 116 may also be positioned at various axial and angular positions on the exterior surface 112 of the hollow structure 104. For example, the first magnet 116A may be at a first axial position $AP_{116A}$, while the second magnet 116B may be at a second axial position $AP_{116B}$. The magnets 116 may also be of various shapes and sizes. As depicted in FIG. 1, the at least two magnets 116 may be angular rings that partially surround the exterior surface 112 of the side wall 106. The magnets 116 may also be angular rings that circumferentially surround the exterior surface 112 of the side wall 106. The magnets 116 may be slidable relative to the exterior of the relative to the exterior surface 112 of the side walls 106 in the axial direction, the angular direction, or both, where the axial direction and angular direction are relative to the center axis A of the hollow structure 104. Thus, the magnets 116 may move axially or angularly on the exterior surface 112 relative to the center axis A, and the magnets 116 may attract the metallic object 114 to impact any point on the interior surface 108 that the solid deposits 102 are located, maximizing removal of the solid deposits 102.

Referring again to FIG. 1, in embodiments, the magnets 116 may include the first magnet 116A, the second magnet 116B, and a first hollow magnet housing 130 with a first inside surface 131 and a second hollow magnet housing 132 with a second inside surface 133. The first magnet 116A may be disposed within the first hollow magnet housing 130 and may be slidable within the first hollow magnet housing 130, while the second magnet 116B may be disposed within the second hollow magnet housing 132 and may be slidable within the second hollow magnet housing 132. The first hollow magnet housing 130 and the second hollow magnet housing 132 may be of slightly larger dimensions than the magnets 116, such that the magnets 116 may slide within the hollow magnet housings 130 and 132.

The first hollow magnet 130 housing and the second hollow magnet housing 132 may each extend around at least a portion of the outer perimeter P of the hollow structure 104, such that the magnets 116 may slide along the outer perimeter P of the hollow structure 104. The first hollow magnet housing 130 and second hollow magnet housing 132 may be slidable relative to the exterior surface 112 of the side walls 106 in the axial direction or the angular direction.

Referring again to FIG. 1, a first angular positioner 156 may be coupled to the first magnet 116A and a second angular positioner 158 may be coupled to the second magnet 116B. The first angular positioner 156 and the second angular positioner 158 may include the first hollow magnet housing 130 and the second hollow magnet housing 132, respectively. The first angular positioner 156 and the second angular positioner 158 may reposition the first magnet 116A and the second magnet 116B, respectively, to different angular positions on the exterior surface 112 of the hollow structure 104. This may allow the metallic object 114 to be attracted to the magnetic field 117 of the magnets 116 on the interior surface 108 corresponding to where the magnets 116 are positioned on the exterior surface 112, as described further below.

Referring again to FIG. 1, the system 100 may further include a first axial positioner 166 coupled to the first magnet 116A. The system 100 may also include a second axial positioner 168 coupled to the second magnet 116B. The first axial positioner 166 and the second axial positioner 168 may reposition the first magnet 116A and the second magnet 116B, respectively, to different axial positions on the exterior surface 112 of the hollow structure 104. This may allow the metallic object 114 to be attracted to the magnetic field 117 of the magnets 116 on the interior surface 108 corresponding to where the magnets 116 are positioned on the exterior surface 112, as described further below.

Figure 12A:
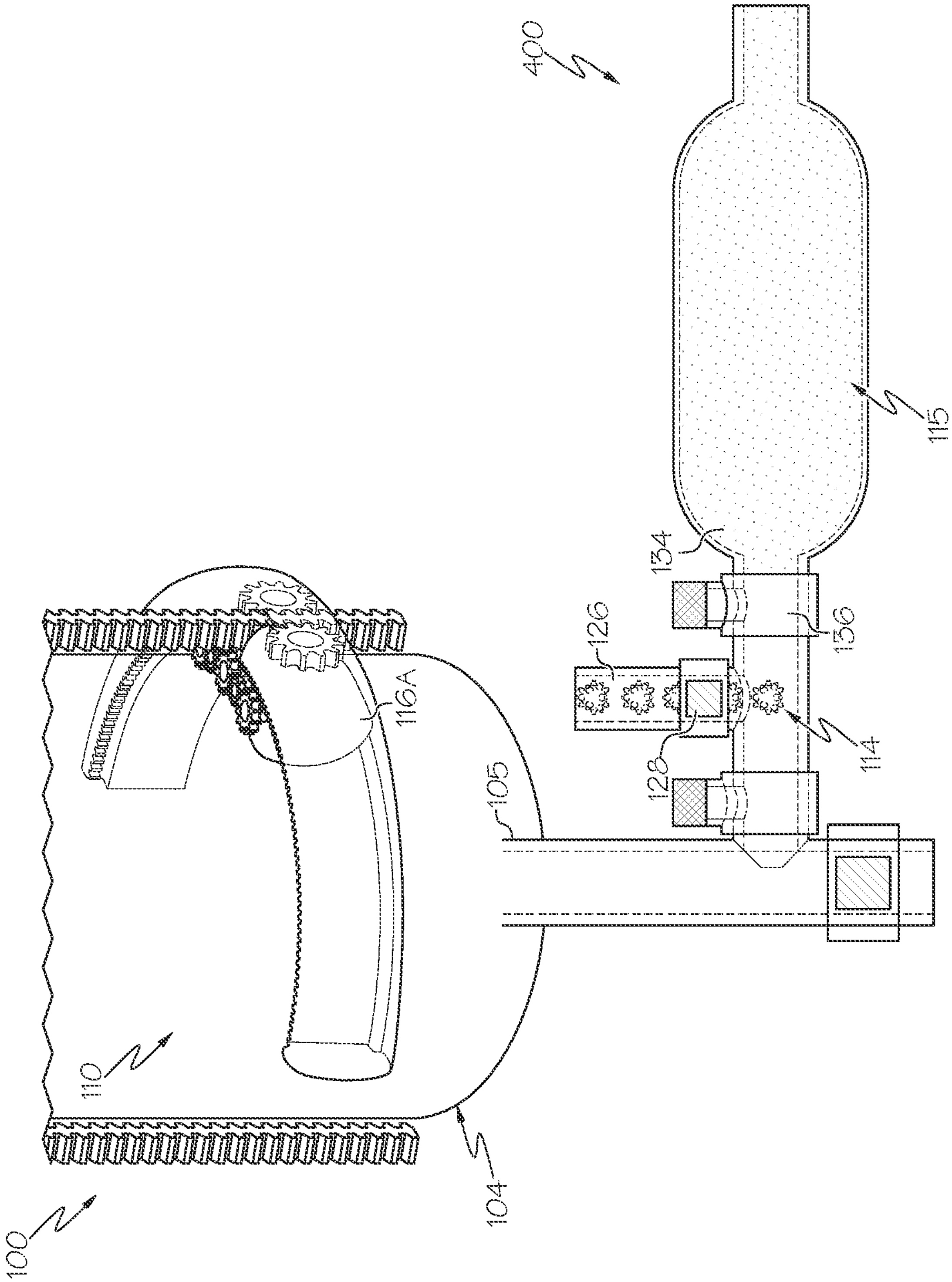
FIG. 12A schematically depicts an injection system for introducing the metallic object to the internal volume of the hollow structure, according to embodiments shown and described in the present disclosure.
Figure 12B:
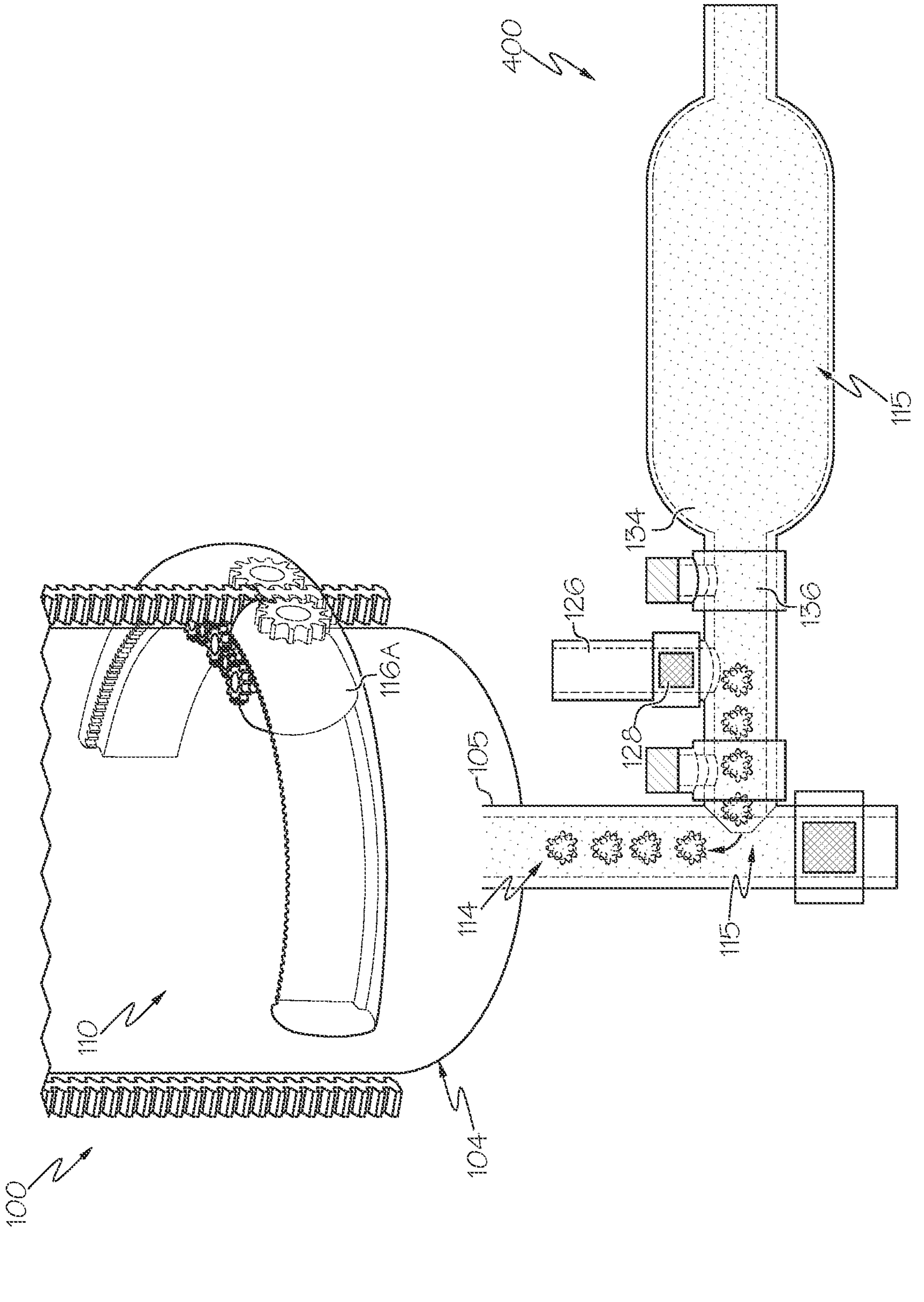
FIG. 12B schematically depicts the injection system of FIG. 12A during introducing a solvent to the internal volume of the hollow structure, according to embodiments shown and described in the present disclosure.

Referring now to FIG. 12A and FIG. 12B, an injection system 400 is depicted. The injection system 400 may be for injecting the metallic object 114, the solvent 115, or both into the internal volume 110 of the hollow structure 104 through the at least one inlet 105. The injection system 400 may include a first channel 126 fluidly coupled to the internal volume 110 and a first valve 128 separating the first channel 126 and the internal volume 110. The metallic object 114 may be introduced to the internal volume 110 through the first channel 126 when the first valve 128 is in an open position. In contrast, when the first valve 128 is in a closed position, the metallic object 114 may be prevented from entering the internal volume 110 of the hollow structure 104. In FIG. 12A, the first valve 128 is in the open position, such that the metallic object 114 is introduced to the internal volume 110 of the hollow structure 104.

Referring again to FIG. 12A and FIG. 12B, the injection system 400 may further include a second channel 134 fluidly coupled to the internal volume 110 and a second valve 136 separating the second channel 134 and the internal volume 110. The solvent 115 may be introduced through the second channel 134 into the internal volume 110 of the hollow structure 104 when the second valve 136 is in an open position. The first valve 128, the second valve 136, or both may be a gate valve, ball valve, or any other suitable valve that would prevent the metallic object 114 or solvent 115 from passing through the first valve 128 and the second valve 136, respectively, in the closed position and would permit the metallic object 114 and the solvent 115 to pass through the first valve 128 and the second valve 136, respectively, in the open position. In FIG. 12B, the first valve 128 and the second valve 136 are in the open position, allowing the metallic object 114 and the solvent 115 to be introduced to the internal volume 110 of the hollow structure 104.

The solvent 115 may be a water solvent, carbon disulfide solvent, or any other suitable solvent. The solvent 115 may function as a carrier of the solid deposits 102 as they are loosened from the interior surface 108 of the side wall 106, as described in further detail below. The solvent 115 may also dissolve the solid deposits 102, or function to further loosen the solid deposits 102 that remain on the interior surface 108 even after the metallic object 114 has impacted the solid deposits 102. In embodiments, translating the magnets 116 in the angular direction may generate a vortex of the solvent 115 to accelerate a rate of solid deposits 102 dissolution in the solvent 115, as described further below in the description of FIGS. 15-18.

Figure 13:
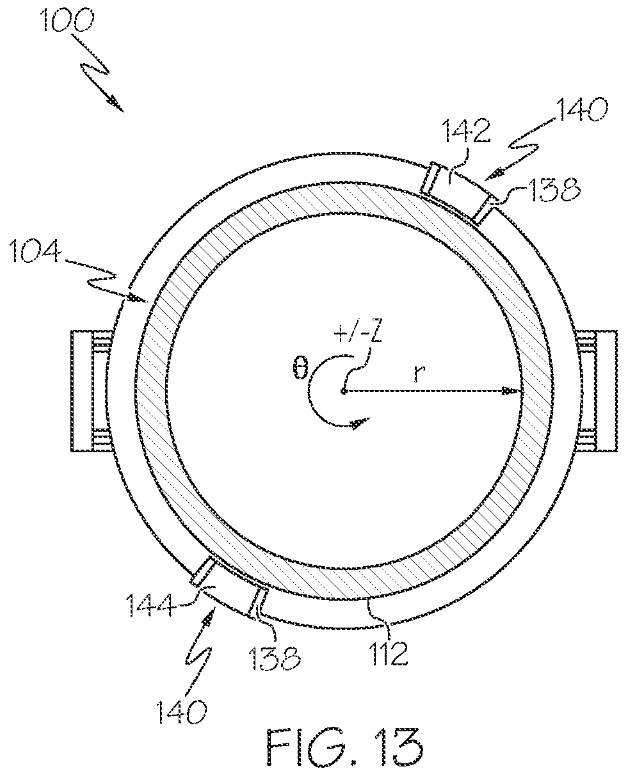
FIG. 13 schematically depicts a top cross-sectional view of the system of FIG. 1 including a sensor for detecting buildup of solid deposits on an interior surface of the hollow structure and positioned on an exterior surface of the hollow structure, according to embodiments shown and described in the present disclosure.

Referring now to FIG. 13, a top cross-sectional view of the system 100 including a sensor 140 is depicted. The system 100 may include the sensor 140 coupled to a sensor positioner 138 and communicatively coupled to the control system 300. The sensor 140 may detect surface characteristics of the interior surface 108 of the side wall 106, while not being inserted into the internal volume 110 of the hollow structure 104. The sensor 140 may also detect irregularities in the surface characteristics of the interior surface 108, such as the solid deposits 102 on the interior surface 108. The system 100 may further comprise the sensor positioner 138 coupled to the exterior surface 112 and communicatively coupled to a control system 300 (as described further below in FIG. 14). The sensor positioner 138 may be operable to move the sensor 140 axially and/or angularly relative to the exterior surface 112 of the hollow structure 104.

In embodiments, the sensor 140 may be a gamma scanner. In embodiments, the sensor 140 may include a ray emitter 142 which may emit rays (such as, but not limited to, gamma-rays) into the hollow structure 104. On an opposing side of the exterior surface 112, the sensor 140 may also include a ray sensor 144, which may detect the rays emitted from the ray emitter 142. Based on the detected rays, the sensor 140 may detect the irregularities in the surface characteristics of the interior surface 108. In embodiments, the sensor 140 may be a gamma-ray sensor, an X-ray sensor, or any other suitable sensor for detecting interior surface characteristics of the hollow structure 104. In embodiments, the system 100 may comprise a single sensor 140 or a plurality of sensors 140.

Figure 14:
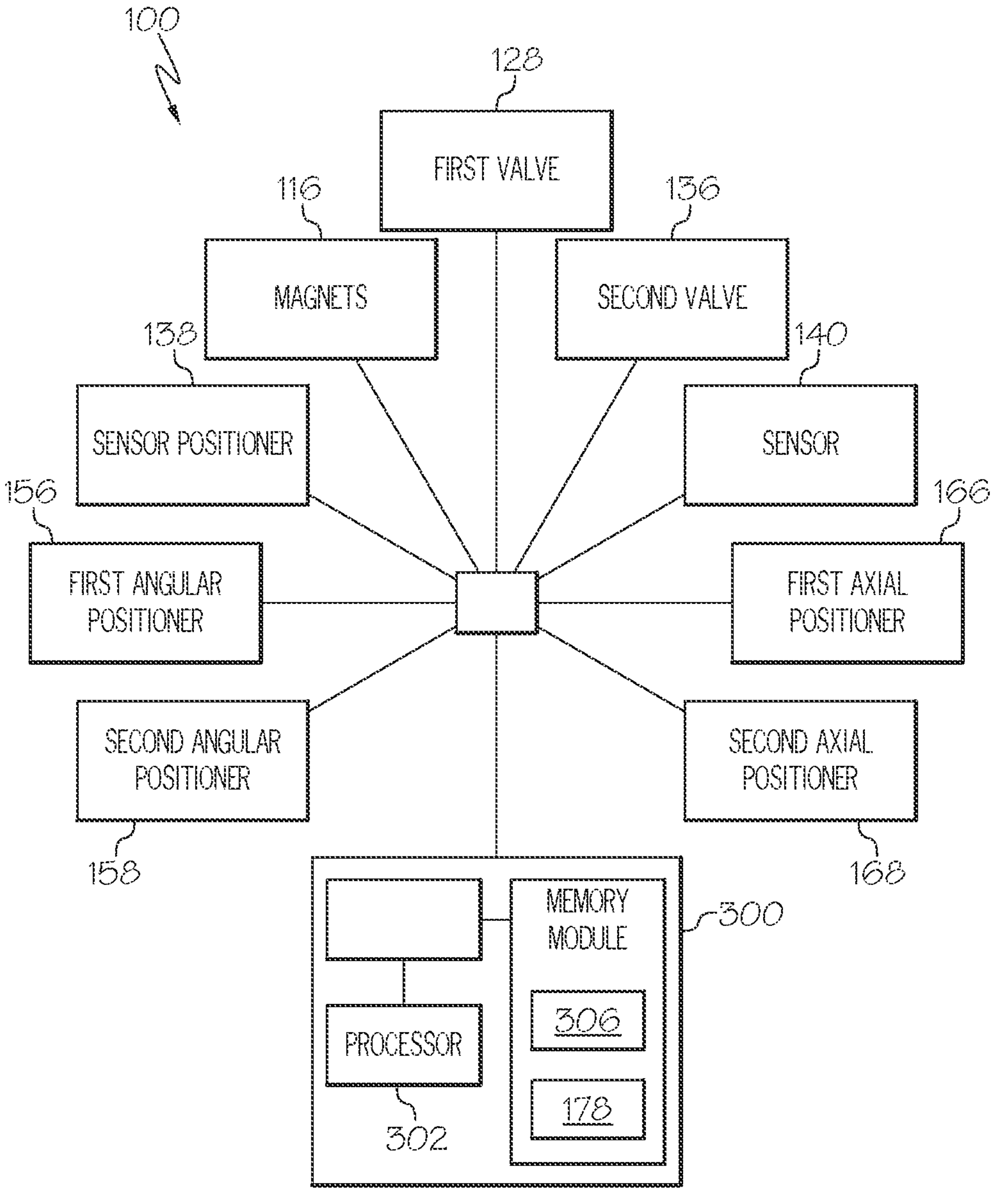
FIG. 14 schematically depicts an illustrative computing environment with a control system communicatively coupled to a plurality of components, according to embodiments shown and described in the present disclosure.

Referring now to FIG. 14, the system 100 may include a control system 300. The control system 300 may be communicatively coupled to a plurality of components, as described further below. The control system 300 may include one or a plurality of processors 302, at least one memory module 304 communicatively coupled to the processor 302, and computer readable and executable instructions 306 stored on the at least one memory module 304. The processor 302 can be any device capable of executing machine readable instructions. The machine readable and executable instructions 306, when executed by the processor 302, may cause the system 100 to automatically perform one or more functions described herein.

The first magnet 116A and the second magnet 116B may be communicatively coupled to the control system 300. The machine readable and executable instructions 306, when executed by the processor 302, may cause the system 100 to automatically activate the first magnet 116A. Referring again to FIG. 1, activating the first magnet 116A may produce the magnetic field 117 that causes the metallic object 114 to travel through the internal volume 110 of the hollow structure 104 and impact the interior surface 108 of the side wall 106 of the hollow structure 104 at the first point 152 on the interior surface 108. Following impact, the machine readable instructions 306, when executed by the processor 302, may deactivate the first magnet 116A, causing the magnetic field 117 coming from the first magnet 116A to dissipate and causing the metallic object 114 to no longer be attracted to the first point 152. After or simultaneous with deactivating the first magnet 116A, the machine readable instructions 306, when executed by the processor 302, may cause the system 100 to activate the second magnet 116B, where activating the second magnet 116B may produce the magnetic field 117 that causes the metallic object 114 to travel through the internal volume 110 of the hollow structure 104 and impact the interior surface 108 of the side wall 106 of the hollow structure 104 at a second point 154 on the interior surface 108. The second point 154 may be spaced apart from the first point 152. As discussed hereinabove, the first magnet 116A may be at the first axial position $AP_{116A}$, while the second magnet 116B may be at a second axial position $AP_{116B}$. In such a case, the first point 152 is at the first axial position $AP_{116A}$ and the second point 154 is at the second axial position $AP_{116B}$.

Impacting the metallic object 114 with the interior surface 108 of the side wall 106 at the first point 152 and the second point 154 may loosen the solid deposits 102 from the interior surface 108 of the side wall 106 at the first point 152 and the second point 154, respectively. The impact may loosen or completely break free the solid deposits 102 from the interior surface 108 of the side wall 106. Once loosened or broken free, the solid deposits 102 may be completely removed from the internal volume 110 when the second valve 136 is opened to introduce the solvent 115 into the hollow structure 104 (discussed further below).

Referring again to FIG. 14, the first angular positioner 156 coupled to the first magnet 116A may be communicatively coupled to the control system 300. The second angular positioner 158 coupled to the second magnet 116B and also communicatively coupled to the control system 300. The first angular positioner 156 and the second angular positioner 158 may be activated a plurality of times to move the first magnet 116A and the second magnet 116B progressively around the outer perimeter of the hollow structure 104, thereby causing the metallic object 114 to impact the interior surface 108 of the side wall 106 at a plurality of points around an interior perimeter of the hollow structure 104.

In embodiments, the machine readable and executable instructions 306, when executed by the processor 302, may further cause the system 100 to automatically operate the first angular positioner 154 to reposition the first magnet 116A at a third position 159 different from a first position 157 after deactivating the first magnet 116A. The system 100 may then deactivate the second magnet 116B and after deactivating the second magnet 116B, activate the first magnet 116A so that the first magnet 116A produces the magnetic field 117 that causes the metallic object 114 to travel through the internal volume 110 of the hollow structure 104 and impact the interior surface 108 of the side wall 106 of the hollow structure 104 at a third point 160 on the interior surface 108. The system 100 may then operate the second angular positioner 158 to reposition the second magnet 116B at a fourth position 162 different from a second position 161.

The system 100 may then deactivate the first magnet 116A and after or simultaneous with deactivating the first magnet 116A, activate the second magnet 116B, where activating the second magnet 116B produces the magnetic field 117 that causes the metallic object 114 to travel through the internal volume 110 of the hollow structure 104 and impact the interior surface 108 of the side wall 106 at a fourth point 164 spaced apart from the third point 160. Impacting the metallic object 114 with the interior surface 108 of the side wall 106 at the third point 160 and the fourth point 164 may loosen the solid deposits 102 from the interior surface 108 of the side wall 106 at the third point 160 and the fourth point 164, respectively. The first position 157 and the third position 159 of the first magnet 116A on the exterior surface 112 may correspond to the first point 152 and the third point 160 on the interior surface 108. Similarly, the second position 161 and the fourth position 162 of the second magnet 116B on the exterior surface 112 may correspond to the second point 154 and the fourth point 164 on the interior surface 108.

The machine readable and executable instructions 306, when executed by the processor 302, may further cause the system 100 to automatically repeat the steps of operating the first angular positioner 156, operating the second angular positioner 158, and activating and deactivating each of the first magnet 116A and second magnet 116B until the metallic object 114 impacts the interior surface 108 of the side wall 106 at a plurality of points extending all the way around an interior perimeter of the side wall 106. The interior perimeter is a shape of the interior surface 108 in the plane perpendicular to the center axis A of the hollow structure 104.

Figure 16:
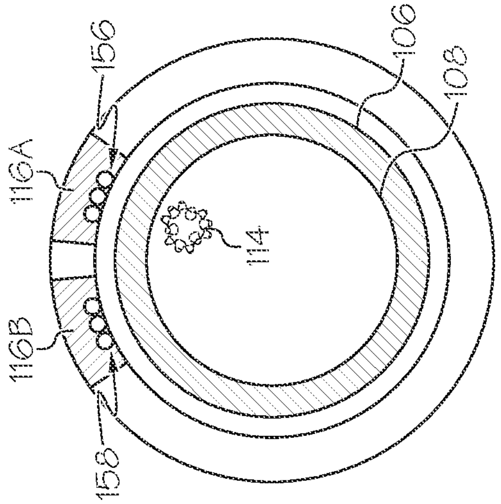
FIG. 16 schematically depicts rolling the metallic object angularly along the interior surface with the first magnet activated and moved angularly, according to embodiments shown and described in the present disclosure.
Figure 15:
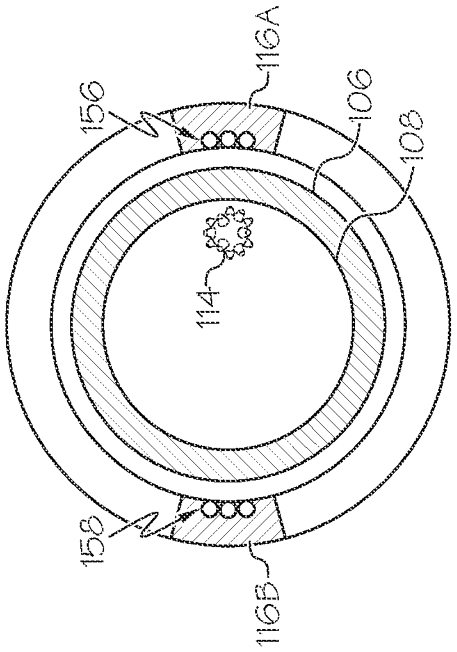
FIG. 15 schematically depicts rolling the metallic object angularly along the interior surface with a first magnet activated, according to embodiments shown and described in the present disclosure.
Figure 18:
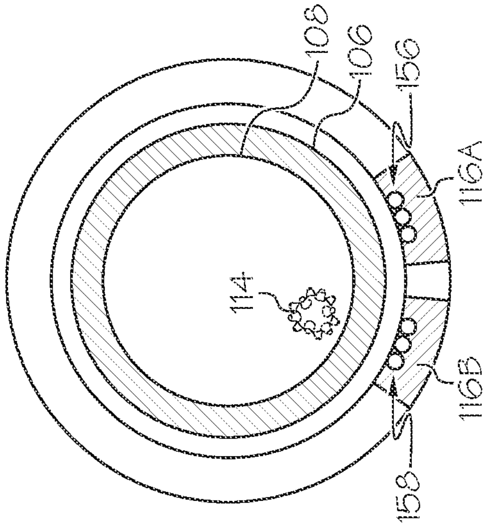
FIG. 18 schematically depicts rolling the metallic object angularly along the interior surface with the second magnet activated and moved angularly, according to embodiments shown and described in the present disclosure.
Figure 17:
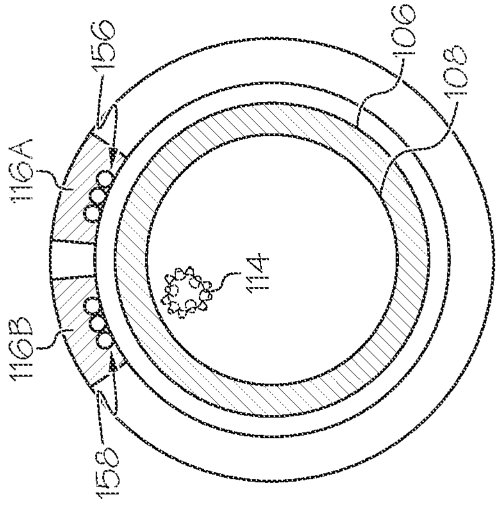
FIG. 17 schematically depicts rolling the metallic object angularly along the interior surface with a second magnet activated, according to embodiments shown and described in the present disclosure.

Referring to FIGS. 15-18, the first angular positioner 156 or the second angular positioner 158 may be operated while the first magnet 116A or the second magnet 116B is still activated. For example, the first magnet 116A may be activated and the first angular positioner 156 may be operated to move the first magnet 116A angularly (as depicted in FIG. 16). This may cause the metallic object 114 to roll or slide (depending on the shape of the metallic object, as explained above) along the interior surface 108. The first magnet 116A may then be adjacent to the second magnet 116B, such that the metallic object 114 rolls or slides along the interior surface 108 to the second magnet 116B when the first magnet 116A is deactivated and the second magnet 116B is activated (as depicted in FIG. 17), rather than causing the metallic object 114 to travel through the internal volume 110 and impact the second point 154 (as depicted in FIG. 1). The second angular positioner 158 may then move while the second magnet 116B is still activated, causing the metallic object 114 to roll or slide (as depicted in FIG. 18). The cycle may then be repeated when the first magnet 116A is activated and the second magnet 116B is deactivated when the magnets 116A and 116B are adjacent to one another and the first angular positioner 156 may be operated to return the metallic object 114 to the position depicted in FIG. 15. The rolling or sliding of the metallic object 114 along the interior surface 108, as depicted in FIGS. 15-18, may generate a vortex of the solvent 115. This may further accelerate the rate of solid deposits 102 in the solvent 115 as well as enhance the loosening or breaking off of the solid deposits 102 on the interior surface 108 of the side walls 106.

In embodiments, there may also be a plurality of magnets 116 positioned angularly around the outer perimeter P of the hollow structure 104 in the hollow magnet housing 130. There may be one, two, three, four, or any suitable number of magnets 116 in the hollow magnet housing 130. The plurality of magnets 116 may be directly adjacent one another, such that there is no space between the magnets 116 around the outer perimeter P of the hollow structure 104. There may also be space between the magnets 116 around the other perimeter P of the hollow structure 104.

In embodiments, the plurality of magnets 116 may be activated and deactivated to move the metallic object 114 angularly to generate the vortex of the solvent 115 as described above. Adjacent magnets 116 may be activated and deactivated in sequence (one beside another) in order to roll or slide the metallic object 114 along the interior surface 108. Thus, the need for the angular positioners 156 and 158 may be eliminated; the vortex of the solvent 115 may be generated through activation and deactivation of individual magnets 116 adjacent one another around the other perimeter P of the hollow structure 104.

Referring again to FIG. 14, the first axial positioner 166 coupled to the first magnet 116A may be communicatively coupled to the control system 300. The second axial positioner 168 coupled to the second magnet 116B may also be communicatively coupled to the control system 300. The machine readable and executable instructions 306, when executed by the processor 302, may cause the system 100 to automatically operate the first axial positioner 166 to reposition the first magnet 116A at a fifth position 169 different from the first position 157 in the axial direction after deactivating the first magnet 116A. The system 100 may then deactivate the second magnet 116B and activate the first magnet 116A, where activating the first magnet 116A may produce the magnetic field 117 that causes the metallic object 114 to travel through the internal volume 110 of the hollow structure 104 and impact the interior surface 108 of the side wall 106 of the hollow structure 104 at a fifth point 170 on the interior surface 108. After deactivating the second magnet 116B, the control system 300 may operate the second axial positioner 168 to reposition the second magnet 116B at a sixth position 172 different from the second position 161 in the axial direction, deactivate the first magnet 116A, and after or simultaneous with deactivating the first magnet 116A, activate the second magnet 116B, where activating the second magnet 116B produces the magnetic field 117 that causes the metallic object 114 to travel through the internal volume 110 of the hollow structure 104 and impact the interior surface 108 of the side wall 106 at a sixth point 174 spaced apart from the fifth point 170. Impacting the metallic object 114 with the interior surface 108 of the side wall 106 at the fifth point 170 and the sixth point 174 may loosen the solid deposits 102 from the interior surface 108 of the side wall 106 at the fifth point 170 and the sixth point 174, respectively.

The machine readable and executable instructions 306, when executed by the processor 302, may cause the control system 300 to automatically repeat the steps of operating the first axial positioner 166, operating the second axial positioner 168, and activating and deactivating each of the first magnet 116A and second magnet 116B until the metallic object 114 impacts the interior surface 108 of the side wall 106 at a plurality of points extending along a portion of or all of the axial length L of the hollow structure, where the axial length axial length L is in an axial direction measured parallel to the center axis A of the hollow structure 104. The first angular positioner 156, the second angular positioner 158, the first axial positioner 166, and the second axial positioner 168 may act independently or simultaneously. Moreover, the angular and axial positions of the magnets 116 may be changed independently or simultaneously. The angular positioners 156 and 158 and the axial positioners 166 and 168 may allow the magnets 116 to attract the metallic object 114 to every point on the interior surface 108 of the hollow structure 104. Thus, the solid deposits 102 may be loosened from all points on the interior surface 108, resulting in the interior surface 108 to be free from the solid deposits 102 (as depicted in FIG. 2A). This allows for the system 100 to operate efficiently.

Referring again to FIG. 13, the system 100 may further include the sensor positioner 138 coupled to the exterior surface 112 and communicatively coupled to the control system 300. The sensor 140 may be coupled to the sensor positioner 138 and communicatively coupled to the control system 300. The sensor positioner 138 may be operable to move the sensor 140 along the entire axial length L, around at least a portion of or all of the interior perimeter of the side wall 106, or both.

The machine readable and executable instructions 306, when executed by the processor 302, may cause the system 100 to automatically operate the sensor positioner 138 to travel in the axial direction, angular direction, or both to position the sensor 140 relative to the side wall 106. The machine readable and executable instructions 306, when executed by the processor 302, may cause the system 100 to automatically operate the sensor 140 to scan the interior surface 108 of the side walls 106. As discussed hereinabove, the sensor 140 may indicate buildup of solid deposits 102 at one or more points on the interior surface 108 of the side wall 106.

The machine readable and executable instructions 306, when executed by the processor 302, may also cause the system 100 to automatically receive a signal from the sensor 140 indicating buildup of solid deposits 102 at the one or more points on the interior surface 108 of the side wall 106, move the first magnet 116A or the second magnet 116B to one of the points where the solid deposits 102 are located on the interior surface 108 of the side walls 106, and activate the first magnet 116A or the second magnet 116B, where activating the first magnet 116A or the second magnet 116B produces the magnetic field 117 that may cause the metallic object 114 to travel through the internal volume 110 of the hollow structure 104 to impact the interior surface 108 of the side wall 106 at the one or more points where the solid deposits 102 are located on the interior surface 108 of the side walls 106. Impacting the metallic object 114 with the interior surface 108 of the side wall 106 at the one or more points where solid deposits 102 are on the interior surface 108 of the side walls 106 may loosen solid deposits 102 from the interior surface 108 of the side wall 106 at the one or more points. The first magnet 116A and the second magnet 116B may be moved by the angular or axial positioners to the one or more points and may be activated or deactivated, as previously discussed in the present disclosure.

Referring again to FIG. 14, the system 100 may also include machine readable and executable instructions 306 that comprise a machine learning module 178. The machine learning module 178 may determine where the solid deposits 102 accumulate on the interior surface 108. The machine learning module 178 may determine where the solid deposits 102 accumulate on the interior surface 108 based on the type of chemical processing occurring within the hollow structure 104, the dimensions of the hollow structure 104, the type of solvent 115, the flow rate of the solvent 115, or any other parameter that may affect where the accumulation of the solid deposits 102 accumulate on the interior surface 108 of the side wall 106. In embodiments, the location of solid deposits 102 on the interior surface 108 may be determined through the use of a 3-D design of the hollow structure 104 uploaded or stored on the at least one memory module 304. The machine learning module 178 may also utilize data stored on the at least one memory module 304 from the sensor positioner 138, the sensor 140, or any other component to determine where the solid deposits 102 accumulate on the interior surface 108. It should be understood that the machine learning module 178 is an example of an artificial intelligence (AI) system that may be used to determine where the solid deposits 102 accumulate on the interior surface 108, however, other AI systems may also be included.

The machine readable and executable instructions 306, when executed by the processor 302, may also cause the system 100 to automatically operate the injection system 400 to introduce the metallic object 114, the solvent 115, or both into the internal volume 110 of the hollow structure 104. Referring again to FIG. 12, the injection system 400 for injecting the metallic object 114, the solvent 115, or both into the internal volume 110 of the hollow structure 104 may include the first valve 128 to introduce the metallic object 114 and the second valve 136 to introduce the solvent 115 when the first valve 128 and the second valve 136 are in the open position.

The machine readable and executable instructions 306, when executed by the processor 302, may cause the system 100 to automatically operate the first valve 128 to the open position to introduce the metallic object 114 to the internal volume 110 of the hollow structure 104. The machine readable and executable instructions 306, when executed by the processor 302, may also cause the system 100 to automatically transition the second valve 136 to the open position to introduce the solvent 115 to the internal volume 110 of the hollow structure 104. The solvent 115 may further remove the solid deposits 102 from the interior surface 108 of the side walls 106 once loosened by the impact of the metallic object 114.

Ferromagnetic dust, such as but not limited to iron oxide, may form within the internal volume 110 of the hollow structure 104 due to corrosion of the interior surface 108 of the side walls 106. Corrosion of the interior surface 108 of the side walls 106 may result from corrosion from the solvent 115 or from the metallic object 114 impacting the interior surface 108 of the side walls 106. The ferromagnetic dust may build up where the magnets 116 are positioned, at the inlet 105, or the outlet 107. Buildup of the ferromagnetic dust may result inefficiencies, weakening a magnetic field 117 generated by the magnets 116 and preventing the solvent 115 or the metallic object 114 from entering or exiting the internal volume 110 through the inlet 105 or outlet 107, respectively.

Additionally, the metallic object 114 may become magnetized due to the magnetic field 117 generated by the magnets 116. As such, the metallic object 114 may attract the ferromagnetic dust. In order to prevent the ferromagnetic dust from accumulating on the metallic object 114, the metallic object 114 may be coated with non-metallic materials. The metallic object 114 may be coated with non-metallic materials such as polymers, ceramics, or any other non-metallic materials.

Figure 20:
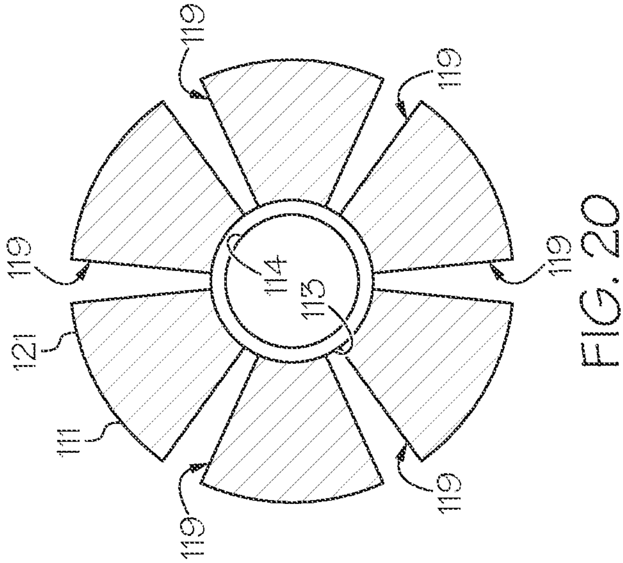
FIG. 20 schematically depicts a top cross-sectional view of the ferromagnetic dust filter of FIG. 19, according to embodiments shown and described in the present disclosure.
Figure 19:
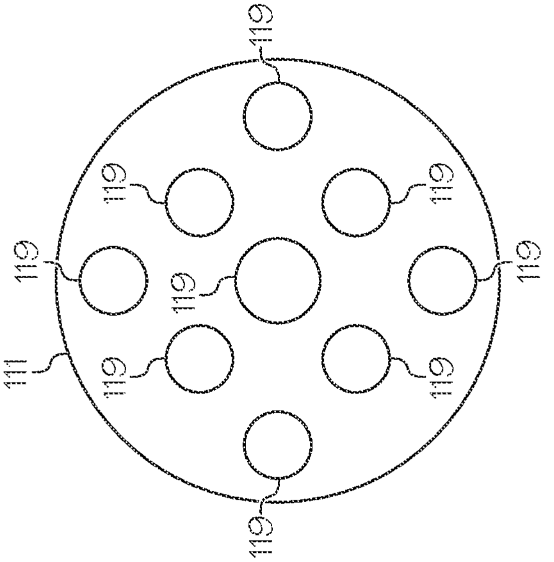
FIG. 19 schematically depicts a top-view of a ferromagnetic dust filter, according to embodiments shown and described in the present disclosure.

In embodiments, a ferromagnetic dust filter 111 may surround the metallic object 114, as depicted in FIGS. 19-20. The ferromagnetic dust filter 111 may comprise a core 113 that houses the metallic object 114, such that the ferromagnetic dust filter 111 surrounds the metallic object 114. The ferromagnetic dust filter 111 may also include a plurality of channels 119 extending from the core 113 through an outer edge 121 of the ferromagnetic dust filter 111. The ferromagnetic dust filter 111 may be comprised any non-magnetic material. Similar to the coating of the magnetic object 114 discussed hereinabove, the ferromagnetic dust filter 111 may comprise polymers, ceramics, or any other non-metallic materials.

As the metallic object 114 becomes magnetized due to the magnetic field 117 generated by the magnets 116, the plurality of channels 119 of the ferromagnetic dust filter 111 may capture the ferromagnetic dust that is attracted to the metallic object 114. The ferromagnetic dust may fill the channels 119 of the ferromagnetic dust filter 111. Once the channels 119 of the ferromagnetic dust filter 111 have been filled to the outer edge 121 of the ferromagnetic dust filter 111, the ferromagnetic dust filter 111 may be removed from the internal volume 110 and the ferromagnetic dust may be cleaned out of the channels 119. Once the channels 119 of the ferromagnetic dust filter 111 have been cleaned, the ferromagnetic dust filter 111 may be reintroduced into the internal volume 110 through the inlet 105. The ferromagnetic dust filter 111 may be utilized at all times on the metallic object 114. In embodiments, the ferromagnetic dust filter 111 may be used periodically to remove the ferromagnetic dust; once the ferromagnetic dust has been captured in the channels 119, the ferromagnetic dust filter 111 may be removed and operation of the system 100 may be continued with use of the metallic object 114 without the ferromagnetic dust filter 111. This may be described as an occasional operating mode, in contrast with the continuous operation mode when the ferromagnetic dust filter 111 is not included and the system 100 can be operated without stopping to remove the ferromagnetic dust.

Referring again to FIG. 1, a process for removing solid deposits 102 from interior surfaces 108 of the hollow structure 104 using the system 100 of the present disclosure may include introducing the metallic object 114 into the hollow structure 104, attracting the metallic object 114 to the first point 152 on the interior surface 108 with the first magnet 116A, where attracting the metallic object 114 to the first point 152 on the interior surface 108 may cause the metallic object 114 to impact the interior surface 108 at the first point 152 and impact of the metallic object 114 with the interior surface 108 at the first point 152 may loosen the solid deposits 102 from the interior surface 108 at the first point 152.

The process may further include attracting the metallic object 114 to the second point 154 on the interior surface 108 with the second magnet 116B, where attracting the metallic object 114 to the second point 154 on the interior surface 108 may cause the metallic object 114 to impact the interior surface 108 at the second point 154 and impact of the metallic object 114 with the interior surface 108 at the second point 154 may loosen the solid deposits 102 from the interior surface 108 at the second point 154. The process may include attracting the metallic object 114 to the first point 152 or the second point 154 by supplying an electric current to the magnets 116, where supplying the electric current induces the magnetic field 117 in the magnets 116. Moreover, the process may include determining where the solid deposits 102 accumulate on the interior surface 108 through the machine learning module 178, so that the magnets 116 may attract the metallic object 114 to the interior surface 108 where the solid deposits 102 accumulate on the interior surface 108.

The first magnet 116A and the second magnet 116B may be slidably coupled to the exterior surface 112 of the side walls 106 during the process described above, such that the magnets 116 may slide along the exterior surface 112, attracting the metallic object 114 to various points on the interior surface 108.

The process may further include moving either of the first magnet 116A or the second magnet 116B angularly along the exterior surface 112, where moving either of the first magnet 116A or the second magnet 116B may roll the metallic object 114 angularly along the interior surface 108. Rolling the metallic object 114 angularly along the interior surface 108 may loosen the solid deposits 102 from the interior surface 108. Rolling the metallic object 114 angularly along the interior surface 108 may also generate the vortex of the solvent 115, as described hereinabove.

The process may further include introducing the solvent 115 to the internal volume 110 of the hollow structure 104, where introducing the solvent 115 may further remove the solid deposits 102 from the interior surfaces 108 of the side walls 106 and may entrain the solid deposits 102. The process may include removing the solvent 115 from the internal volume 110 of the hollow structure 104, where the solid deposits 102 are contained in the solvent 115 and removed from the internal volume 110 with the solvent 115. Thus, the solvent clears out the solid deposits 102 from the internal volume 110. The solid deposits 102 may be removed from the interior surface 108 through the process using the system 100 at a temperature and pressure within the normal operating temperature range of the hollow structure 104.

The process may further include capturing the ferromagnetic dust within the internal volume 110 of the hollow structure 104. Capturing the ferromagnetic dust within the internal volume 110 of the hollow structure 104 may comprise introducing the ferromagnetic dust filter 111 into the internal volume 110 and operating the magnets to propagate the ferromagnetic dust filter 111 back and forth through the internal volume 110. As the ferromagnetic dust filter 110 is exposed to the magnetic field, the metallic object 114 in the center of the ferromagnetic dust filter 111 may become magnetized. The ferromagnetic dust in the internal volume 110 may be attracted to the magnetized metallic object 114, which may cause the magnetic dust to enter and be captured in the channels 119 of the ferromagnetic dust filter 111. The process may then include removing the ferromagnetic dust filter 111 from the internal volume 110, cleaning the ferromagnetic dust filter 111, and reintroducing the ferromagnetic dust filter 111 into the internal volume 110.

As previously discussed, the system 100 may include the one or more processors 302 and one or more memory modules 304. The one or more processors 302 may include any device capable of executing computer-readable executable instructions stored on a non-transitory computer-readable medium. Accordingly, each processor 302 may include an integrated circuit, a microchip, a computer, and/or any other computing device. The one or more memory modules 304 are communicatively coupled to the one or more processors 302 over a communication path. The one or more memory modules 304 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 304 may be configured to store machine readable and executable instructions 306 for operating one or more components of the system 100.

Embodiments of the present disclosure include logic stored on the one or more memory modules 304 that includes machine-readable and executable instructions or an algorithm written in any programming language of any generation (e.g., 1GL, 2GL, 3GL, 4GL, and/or 5GL) such as, machine language that may be directly executed by the one or more processors 302, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

EXAMPLES

The various embodiments of systems and processes for chemical processing is further clarified by the following example. The example is illustrative in nature, and should not be understood to limit the subject matter of the present disclosure.

Example 1: Solubility of Coke

In Example 1, the solubility of coke obtained from a supercritical water reactor in solvent was investigated. For Example 1, 0.102 grams of coke was submerged in 10 grams of 1-2 dichlorobenzene (the solvent) for four minutes at room temperature to generate a solution. The solution was then mixed for one minute and then filtered through filter paper with a porosity of 0.45 micrometers. There were 0.0649 grams of coke remaining in the filter paper. Thus, the remaining 0.0371 grams of coke were dissolved into the solvent. It was also observed that the 0.0649 grams of coke remaining in the filter paper was broken down into smaller pieces when compared to the coke pieces that were submerged into the solvent.

A first aspect of the present disclosure may be directed to a system for chemical processing that may include a hollow structure that may include at least one side wall having an exterior surface and an interior surface defining an internal volume of the hollow structure. The hollow structure may have a center axis, a length measured parallel to the center axis, and an outer perimeter, where the outer perimeter may be a shape of the exterior surface of the at least one side wall of the hollow structure in a plane perpendicular to the center axis. The system may also include at least one metallic object positioned within the internal volume of the hollow structure, where the at least one metallic object may be decoupled from the interior surface and free to move relative to the hollow structure. The system may also include at least two magnets slidably coupled to the exterior surface of the at least one side wall, where the at least two magnets may guide movement of the at least one metallic object within the hollow structure.

A second aspect of the present disclosure may include the first aspect, where the at least one metallic object may be spherical with a plurality of elevated surface features.

A third aspect of the present disclosure may include the second aspect, where the plurality of elevated surface features may be rotatable.

A fourth aspect of the present disclosure may include any one of the first through third aspects, where the at least one metallic object may have a hardness of from 40 to 70 on the Rockwell C Scale.

A fifth aspect of the present disclosure may include any one of the first through fourth aspects, where the at least one metallic object may comprise Cobalt, Nickel, Awaruite, Permalloy, Wairakite, or combinations thereof.

A sixth aspect of the present disclosure may include any one of the first through fifth aspects, where the at least two magnets may be electromagnets.

A seventh aspect of the present disclosure may include any one of the first through sixth aspects, where the at least two magnets may be permanent magnets.

An eighth aspect of the present disclosure may include any one of the first through seventh aspects, where the at least two magnets may be on opposing sides of the hollow structure.

A ninth aspect of the present disclosure may include any one of the first through eighth aspects, where each of the at least two magnets may extend around at least a portion of the outer perimeter of the hollow structure.

A tenth aspect of the present disclosure may include any one of the first through ninth aspects, where the at least two magnets may each be slidably coupled to the exterior surface of the at least one side wall.

An eleventh aspect of the present disclosure may include any one of the first through tenth aspects, where the at least two magnets may be slidable relative to the exterior surface of the at least one side wall in an axial direction, an angular direction, or both, where the axial direction and the angular direction may be relative to the center axis of the hollow structure.

A twelfth aspect of the present disclosure may include any one of the first through eleventh aspects, where the at least two magnets may comprise a first magnet and a second magnet, and the system may further comprise a first hollow magnet housing with a first inside surface and a second hollow magnet housing with a second inside surface, where the first hollow magnet housing and the second hollow magnet housing may each extend around at least a portion of the outer perimeter of the hollow structure. The first magnet may be disposed within the first hollow magnet housing and may be slidable within the first hollow magnet housing. The second magnet may be disposed within the second hollow magnet housing and may be slidable within the second hollow magnet housing.

A thirteenth aspect of the present disclosure may include the twelfth aspect, where the first hollow magnet housing and the second hollow magnet housing may be slideable relative to the exterior surface of the at least one side wall in a substantially axial direction.

A fourteenth aspect of the present disclosure may include any one of the first through thirteenth aspects, further comprising an injection system for injecting the at least one metallic object, a solvent, or both into the internal volume of the hollow structure.

A fifteenth aspect of the present disclosure may include the fourteenth aspect, where the injection system comprises: a first channel fluidly coupled to the internal volume of the hollow structure and a first valve separating the first channel and the internal volume, where the at least one metallic object may be introduced to the internal volume through the first channel when the first valve is in the open position.

A sixteenth aspect of the present disclosure may include the fifteenth aspect, where the injection system further comprises a second channel fluidly coupled to the internal volume and a second valve separating the second channel and the internal volume, where the solvent may be introduced through the second channel into the internal volume of the hollow structure when the second valve is in an open position.

A seventeenth aspect of the present disclosure may include any one of the first through sixteenth aspects, further comprising a control system communicatively coupled to the at least two magnets, where the at least two magnets comprise a first magnet and a second magnet and the control system comprises a processor, at least one memory module communicatively coupled to the processor, and machine readable and executable instructions stored on the at least one memory module. The machine readable and executable instructions, when executed by the processor, may cause the system to automatically activate the first magnet, where activating the first magnet may produce a magnetic field that causes the at least one metallic object to impact the interior surface of the at least one side wall of the hollow structure at a first point on the interior surface. The system may also automatically deactivate the first magnet. After or simultaneous with deactivating the first magnet, the system may automatically activate the second magnet, where activating the second magnet may produce the magnetic field that causes the at least one metallic object to travel through the internal volume of the hollow structure and impact the interior surface of the at least one side wall of the hollow structure at a second point on the interior surface spaced apart from the first point. Impacting the at least one metallic object with the interior surface of the at least one side wall at the first point and the second point may loosen solid deposits from the interior surface of the at least one side wall at the first point and the second point, respectively.

An eighteenth aspect of the present disclosure may include the seventeenth aspect, where the system comprises a first angular positioner coupled to the first magnet and communicatively coupled to the control system and a second angular positioner coupled to the second magnet and communicatively coupled to the control system. The machine readable and executable instructions, when executed by the processor, may further cause the system to automatically, after deactivating the first magnet, operate the first angular positioner to reposition the first magnet at a third position different from a first position, deactivate the second magnet, and after deactivating the second magnet, activate the first magnet, where activating the first magnet may produce the magnetic field that causes the at least one metallic object to travel through the internal volume of the hollow structure and impact the interior surface of the at least one side wall of the hollow structure at a third point on the interior surface. After deactivating the second magnet, the system may automatically operate the second angular positioner to reposition the second magnet at a fourth position different from a second position, deactivate the first magnet, and after or simultaneous with deactivating the first magnet, activate the second magnet. Activating the second magnet may produce the magnetic field that causes the at least one metallic object to travel through the internal volume of the hollow structure and impact the interior surface of the at least one side wall at a fourth point spaced apart from the third point. Impacting the at least one metallic object with the interior surface of the at least one side wall at the third point and the fourth point may loosen solid deposits from the interior surface of the at least one side wall at the third point and the fourth point, respectively.

A nineteenth aspect of the present disclosure may include the eighteenth aspect, where the machine readable and executable instructions, when executed by the processor, cause the control system to automatically repeat the steps of operating the first angular positioner, operating the second angular positioner, and activating and deactivating each of the first magnet and the second magnet until the at least one metallic object impacts the interior surface of the at least one side wall at a plurality of points extending all the way around an interior perimeter of the at least one side wall. The interior perimeter may be a shape of the interior surface in the plane perpendicular to the center axis of the hollow structure A twentieth aspect of the present disclosure may include any one of the seventeenth through nineteenth aspects, where the system comprises a first axial positioner coupled to the first magnet and communicatively coupled to the control system and a second axial positioner coupled to the second magnet and communicatively coupled to the control system. The machine readable and executable instructions, when executed by the processor, may further cause the system to automatically, after deactivating the first magnet, operate the first axial positioner to reposition the first magnet at a fifth position different from a first position, deactivate the second magnet, and after deactivating the second magnet, activate the first magnet. Activating the first magnet may produce the magnetic field that causes the at least one metallic object to travel through the internal volume of the hollow structure and impact the interior surface of the at least one side wall of the hollow structure at a fifth point on the interior surface. After deactivating the second magnet, the system may automatically operate the second axial positioner to reposition the second magnet at a sixth position different from a second position, deactivate the first magnet, and after or simultaneous with deactivating the first magnet, activate the second magnet Activating the second magnet may produce the magnetic field that causes the at least one metallic object to travel through the internal volume of the hollow structure and impact the interior surface of the at least one side wall at a sixth point spaced apart from the fifth point. Impacting the at least one metallic object with the interior surface of the at least one side wall at the fifth point and the sixth point may loosen solid deposits from the interior surface of the at least one side wall at the fifth point and the sixth point, respectively.

A twenty-first aspect of the present disclosure may include the twentieth aspect, where the machine readable and executable instructions, when executed by the processor, may cause the control system to automatically repeat the steps of operating the first axial positioner, operating the second axial positioner, and activating and deactivating each of the first magnet and the second magnet until the at least one metallic object impacts the interior surface of the at least one side wall at a plurality of points extending an entire axial length. The entire axial length may be in an axial direction measured parallel to the center axis of the hollow structure A twenty-second of the present disclosure may include either of the twentieth or twenty-first aspects, where the system comprises a sensor positioner coupled to the exterior surface and communicatively coupled to the control system and a sensor coupled to the sensor positioner and communicatively coupled to the control system. The machine readable and executable instructions, when executed by the processor, may further cause the system to automatically operate the sensor positioner to travel in an axial direction measured parallel to the center axis of the hollow structure and operate the sensor to scan the interior surface of the at least one side wall. The sensor may indicate buildup of solid deposits at one or more points on the interior surface of the at least one side wall.

A twenty-third aspect of the present disclosure may include the twenty-second aspect, where the machine readable and executable instructions, when executed by the processor, may cause the control system to automatically receive a signal from the sensor indicating buildup of solid deposits at the one or more points on the interior surface of the at least one side wall, move the first magnet or the second magnet to one of the one or more points where solid deposits are on the interior surface of the at least one side wall, and activate the first magnet or the second magnet. Activating the first magnet or the second magnet may produce the magnetic field that causes the at least one metallic object to travel through the internal volume of the hollow structure and impact the interior surface of the at least one side wall at the one or more points where the solid deposits are on the interior surface of the at least one side wall. Impacting the at least one metallic object with the interior surface of the at least one side wall at the one or more points where the solid deposits are on the interior surface of the at least one side wall may loosen solid deposits from the interior surface of the at least one side wall at the one or more points.

A twenty-fourth aspect of the present disclosure may include any one of the seventeenth through twenty-third aspects, where the system comprises an injection system for injecting the at least one metallic object, a solvent, or both into the internal volume of the hollow structure, where the injection system comprises a second channel fluidly coupled to the internal volume and a second valve separating the second channel and the internal volume, where the solvent may be introduced through the second channel into the internal volume of the hollow structure when the second valve is in an open position. The machine readable and executable instructions, when executed by the processor, may further cause the system to automatically operate the second valve to the open position to introduce the solvent to the internal volume of the hollow structure. The solvent may further remove solid deposits from the interior surface of the at least one side wall once loosened.

A twenty-fifth aspect of the present disclosure may include any one of the first through twenty-fourth aspects, where the hollow structure may be a vessel or a conduit.

A twenty-sixth aspect of the present disclosure may include the twenty-fifth aspect, where the hollow structure may be a vessel comprising a reactor.

A twenty-seventh aspect of the present disclosure may include any one of the first through twenty-sixth aspects, where the at least one metallic object may be coated with a non-metallic material.

A twenty-eighth aspect of the present disclosure may include any one of the first through twenty-seventh aspects, further comprising a ferromagnetic dust filter with a plurality of channels. The ferromagnetic dust filter may surround the at least one metallic object.

A twenty-ninth aspect of the present disclosure may include the twenty-eighth aspect, where the ferromagnetic dust filter may be operable to attract ferromagnetic dust and capture the ferromagnetic dust within the plurality of channels.

A thirtieth aspect of the present disclosure may be directed to a process for removing solid deposits from interior surfaces of a hollow structure that may include introducing at least one metallic object into the hollow structure, the hollow structure comprising at least one side wall having an exterior surface and an interior surface defining an internal volume of the hollow structure. The hollow structure may have a center axis, a length measured parallel to the center axis, and an outer perimeter. The outer perimeter may be a shape of the exterior surface of the at least one side wall of the hollow structure in a plane perpendicular to the center axis. The process may also include attracting the at least one metallic object to a first point on the interior surface with a first magnet. Attracting the at least one metallic object to the first point on the interior surface may cause the at least one metallic object to impact the interior surface at the first point and impact of the at least one metallic object with the interior surface at the first point may loosen solid deposits from the interior surface at the first point. The process may also include attracting the at least one metallic object to a second point on the interior surface with a second magnet. Attracting the at least one metallic object to the second point on the interior surface may cause the at least one metallic object to impact the interior surface at the second point and impact of the at least one metallic object with the interior surface at the second point may loosen solid deposits from the interior surface at the second point.

A thirty-first aspect of the present disclosure may include the thirtieth aspect, where the first magnet may be slidably coupled to the exterior surface of the at least one side wall.

A thirty-second aspect of the present disclosure may include the thirty-first aspect, where the second magnet may be slidably coupled to the exterior surface of the at least one side wall.

A thirty-third aspect of the present disclosure may include the thirty-second aspect, further comprising removing the solid deposits loosened from the interior surface from the hollow structure.

A thirty-fourth aspect of the present disclosure may include the thirty-third aspect, where removing the solid deposits comprises introducing a solvent to the internal volume of the hollow structure. Introducing the solvent may further remove the solid deposits from the interior surfaces of the at least one side wall and may entrain the solid deposits. Removing the solid deposits may also comprise removing the solvent from the internal volume of the hollow structure. The solid deposits may be contained in the solvent and may be removed from the internal volume with the solvent.

A thirty-fifth aspect of the present disclosure may include the thirty-fourth aspect, further comprising removing the solid deposits from the interior surface of the hollow structure at a temperature within a normal operating temperature range of the hollow structure.

A thirty-sixth aspect of the present disclosure may include any one of the thirtieth through thirty-fifth aspects, further comprising supplying an electric current to the first magnet or the second magnet, where supplying the electric current may induce a magnetic field in the first magnet or the second magnet.

A thirty-seventh aspect of the present disclosure may include the thirty-sixth aspect, further comprising determining where the solid deposits accumulate on the interior surface through a machine learning module.

A thirty-eighth aspect of the present disclosure may include any one of the thirtieth through thirty-seventh aspects, where either of the first magnet or the second magnet may be positioned where the solid deposits accumulates on the interior surface.

A thirty-ninth aspect of the present disclosure may include any one of the thirtieth through thirty-eighth aspects, further comprising moving either of the first magnet or the second magnet angularly along the exterior surface. Moving either of the first magnet or the second magnet may roll the at least one metallic object angularly along the interior surface. Rolling the at least one metallic object angularly along the interior surface may loosen solid deposits from the interior surface.

A fortieth aspect of the present disclosure may include any one of the thirtieth through thirty-ninth aspects, further comprising introducing a ferromagnetic dust filter into the internal volume, where the ferromagnetic dust filter comprises a plurality of channels surrounding the at least one metallic object.

A forty-first aspect of the present disclosure may include the fortieth aspect, further comprising operating the first magnet and the second magnet to move the ferromagnetic dust filter through the internal volume, where movement of the ferromagnetic dust filter through the internal volume may capture ferromagnetic dust in the plurality of channels of the ferromagnetic dust filter.

It may be noted that one or more of the following claims utilize the terms “where,” “wherein,” or “in which” as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term “comprising.”

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential components of the various embodiments described in this disclosure, even in cases where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The invention claimed is:

1. A system for chemical processing, the system comprising:

a hollow structure comprising at least one side wall having an exterior surface and an interior surface defining an internal volume of the hollow structure, where:

the hollow structure has a central axis, a length measured parallel to the central axis, and an outer perimeter, where the outer perimeter is a shape of the exterior surface of the at least one side wall of the hollow structure in a plane perpendicular to the center axis;

at least one metallic object positioned within the internal volume of the hollow structure, where the at least one metallic object is decoupled from the interior surface and free to move relative to the hollow structure;

at least two magnets slidably coupled to the exterior surface of the at least one side wall, where the at least two magnets comprise a first magnet and a second magnet that guide movement of the at least one metallic object within the hollow structure;

a first angular positioner coupled to the first magnet and affixed to the hollow structure, wherein the first angular positioner can move the first magnet to different positions on the outer perimeter;

a second angular positioner coupled to the second magnet and affixed to the hollow structure, wherein the second angular positioner can move the second magnet to different positions on the outer perimeter;

a first axial positioner coupled to the first magnet and affixed to the hollow structure, wherein the first axial positioner can move the first magnet to different positions on a line parallel to the central axis;

a second axial positioner coupled to the second magnet and affixed to the hollow structure, wherein the second axial positioner can move the second magnet to different positions on a line parallel to the central axis;

where the first angular positioner allows an angular position of the first magnet to be changed independently of the second magnet, and where the second angular positioner allows an angular position of the second magnet to be changed independently of the first magnet; and where the first axial positioner allows an axial position of the first magnet to be changed independently of the second magnet, and where the second axial positioner allows an axial position of the second magnet to be changed independently of the first magnet.

2. The system of claim 1, where the at least one metallic object is spherical with a plurality of elevated surface features.

3. The system of claim 2, where the plurality of elevated surface features are rotatable.

4. The system of claim 1, where the at least one metallic object has a hardness of from 40 to 70 on the Rockwell C Scale.

5. The system of claim 1, where the at least two magnets are electromagnets.

6. The system of claim 1, where the at least two magnets are permanent magnets.

7. The system of claim 1, where the at least two magnets are on opposing sides of the hollow structure.

8. The system of claim 1, where each of the at least two magnets extends around at least a portion of the exterior surface.

9. The system of claim 1, where the at least two magnets are slidable relative to the exterior surface of the at least one side wall in an axial direction, an angular direction, or both, where the axial direction and the angular direction are relative to the center axis of the hollow structure.

10. The system of claim 1, where the system further comprises a first hollow magnet housing with a first inside surface and a second hollow magnet housing with a second inside surface, where:

the first hollow magnet housing and the second hollow magnet housing each extend around at least a portion of the exterior surface;

the first magnet is disposed within the first hollow magnet housing and is slidable within the first hollow magnet housing; and the second magnet is disposed within the second hollow magnet housing and is slidable within the second hollow magnet housing.

11. The system of claim 10, where the first hollow magnet housing and the second hollow magnet housing are slideable relative to the exterior surface of the at least one side wall in a substantially axial direction.

12. The system of claim 1, where the at least one metallic object is coated with a non-metallic material.

* * * * *